Sept. 19, 1961

E. P. WARNKEN 3,000,429

MACHINE FOR PRESTRESSING AND MOLDING
REINFORCED PLASTIC MEMBERS

Filed June 22, 1956

INVENTOR.
ELMER P. WARNKEN

BY
*Victor D. Behn*
ATTORNEY

Sept. 19, 1961   E. P. WARNKEN   3,000,429
MACHINE FOR PRESTRESSING AND MOLDING
REINFORCED PLASTIC MEMBERS
Filed June 22, 1956   3 Sheets-Sheet 3
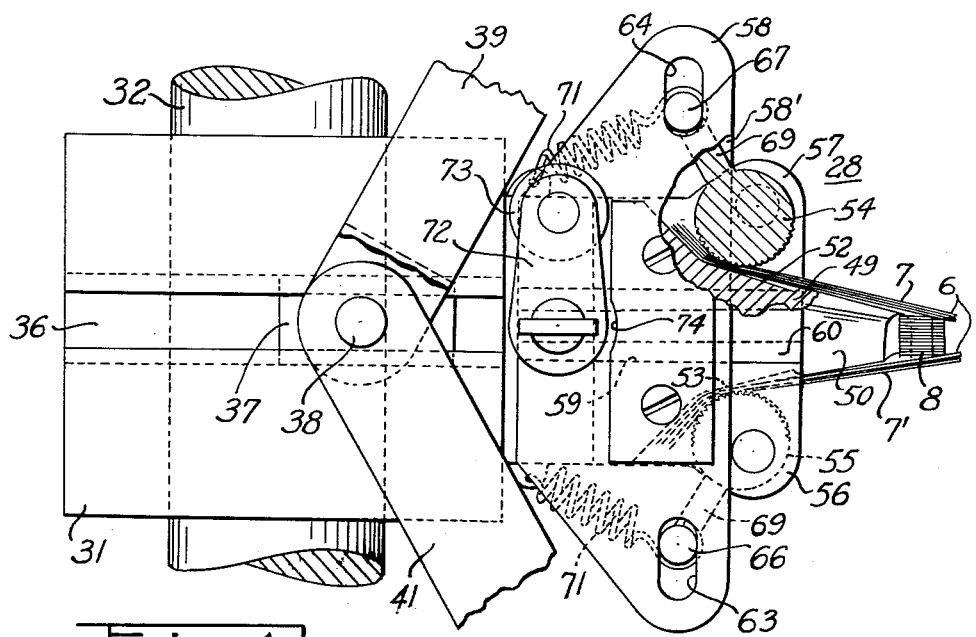
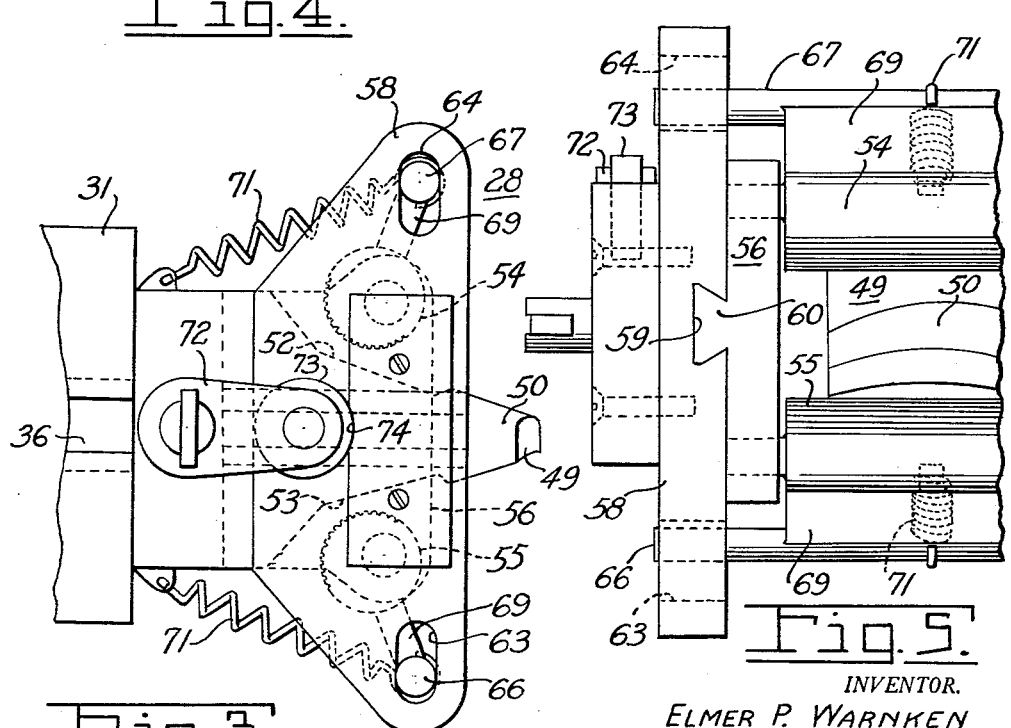
INVENTOR.
ELMER P. WARNKEN
BY
Victor D. Behn
ATTORNEY United States Patent Office 3,000,429
Patented Sept. 19, 1961

3,000,429
MACHINE FOR PRESTRESSING AND MOLDING REINFORCED PLASTIC MEMBERS
Elmer P. Warnken, Cincinnati, Ohio, assignor to Studebaker-Packard Corporation, South Bend, Ind., a corporation of Michigan
Filed June 22, 1956, Ser. No. 593,117
9 Claims. (Cl. 154—1)

This invention relates to a machine for stressing and molding reinforced plastic members while under stress, such as compressor blades and the like.

More particularly, the machine embodying the invention is designed to mold plastic members having therein reinforcing members such as fibres having the capacity to take tension strains. The machine is provided with means associated with the mold for loading the fibres in tension and maintaining the tension in the fibres until the mold has closed and the members have been formed and set.

An object of the invention is to provide a mold, having relatively movable mold or die members for molding plastic members provided with reinforcing fibres, with novel means for holding a reinforced plastic member between the mold parts and subjecting the same to a tension load while the mold closes and maintaining that tension until the plastic has set.

Another object of the invention is to so construct and arrange the tensioning means set forth in the next preceding object that the position of the stressed plastic member is maintained relatively fixed in position with respect to the part line of the mold during the closing motion of the mold parts.

Still another object of this invention is to provide a novel machine of this type in which gripping jaws engage and stress reinforcing fibres in tension as the reinforcing fibres are molded into blade form.

A further object of this invention is to provide a machine having gripping jaws for gripping and prestressing such reinforcing members, the gripping jaws being so mounted as to move in unison with closing of mold parts to maintain the same relative position of the prestressed members to the part line of the mold while the mold is closing as when the mold is closed.

A further object of this invention is to provide gripping jaws adapted to so engage portions of reinforcing members on opposite sides of an intermediate die member that the main die members are closed upon an intermediate die member while maintaining tension on the reinforcing members.

A further object of this invention is to provide a mold having an hydraulically actuated prestressing device in which gripping jaws and a hydraulic prestressing device move in unison with the closing of mold parts.

Other objects of the invention will become apparent upon reading the annexed detailed description in connection with the drawing in which:

FIG. 3 is an enlarged, fragmentary view in side elevation showing one of the clamp members in open position;

FIG. 4 is an enlarged fragmentary view partly in side elevation and partly in section, showing the clamp of FIG. 3 in closed position, a portion of the clamp being shown broken away and in section for clarity of disclosure;

FIG. 5 is a fragmentary end view in elevation of the clamp of FIGS. 3 and 4;

In the following detailed description, and the drawings, like reference characters indicate like parts.

Figures 6, 7:
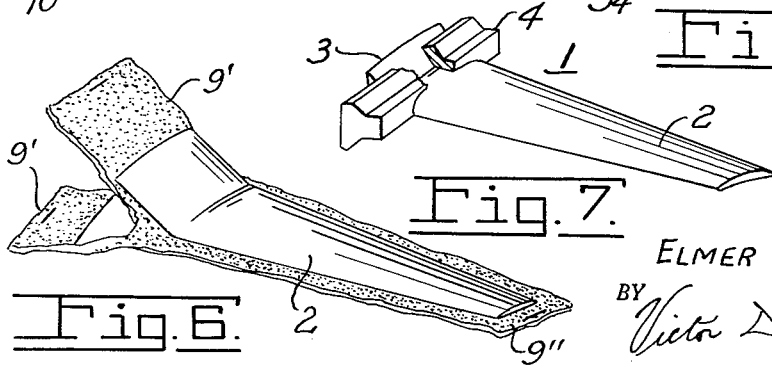
FIG. 6 is a perspective view of a compressor blade molded in the machine, the compressor blade being shown in the form in which the blade is removed from the machine.
FIG. 7 is a perspective view partly broken away of a finished blade and blade-holding member.

In FIG. 7 is illustrated a compressor blade 1 having a blade portion 2 of airfoil shape and a thickened root end portion 3. A blade retainer member 4 of metal or the like is received on the blade and engages the thickened root end portion. The retainer member 4 may be received in one of the blade mounting slots of the rotor of an aircraft jet engine (not shown) for mounting the blade therein. The blade may be of the type more fully described and claimed in my co-pending applications Serial No. 427,739 filed May 5, 1954, now Patent No. 2,934,317, and Serial No. 314,698 filed October 14, 1952.

Figure 1:
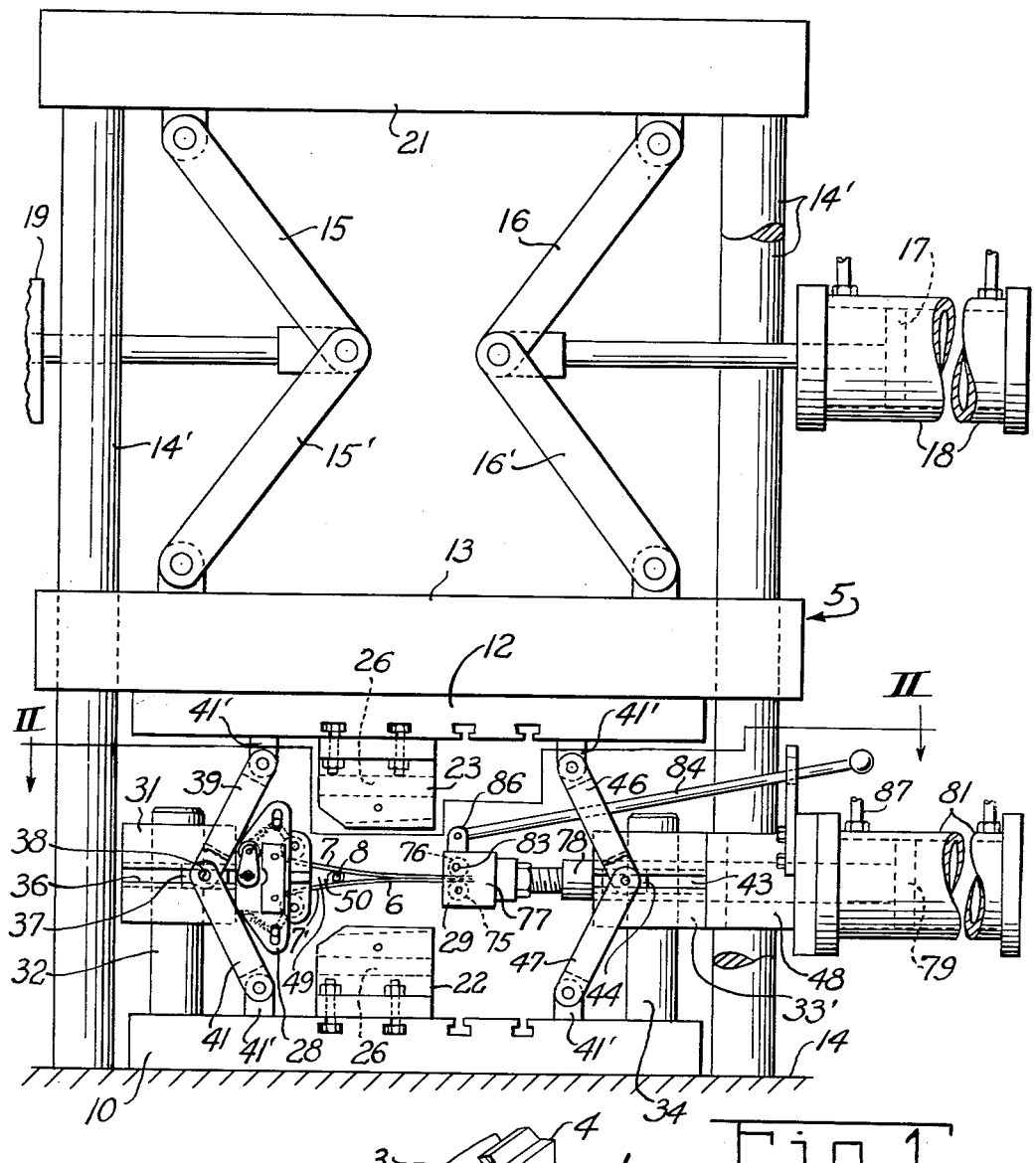
FIG. 1 is a view in side elevation, partly broken away, of a machine constructed in accordance with an embodiment of this invention.
Figure 2:
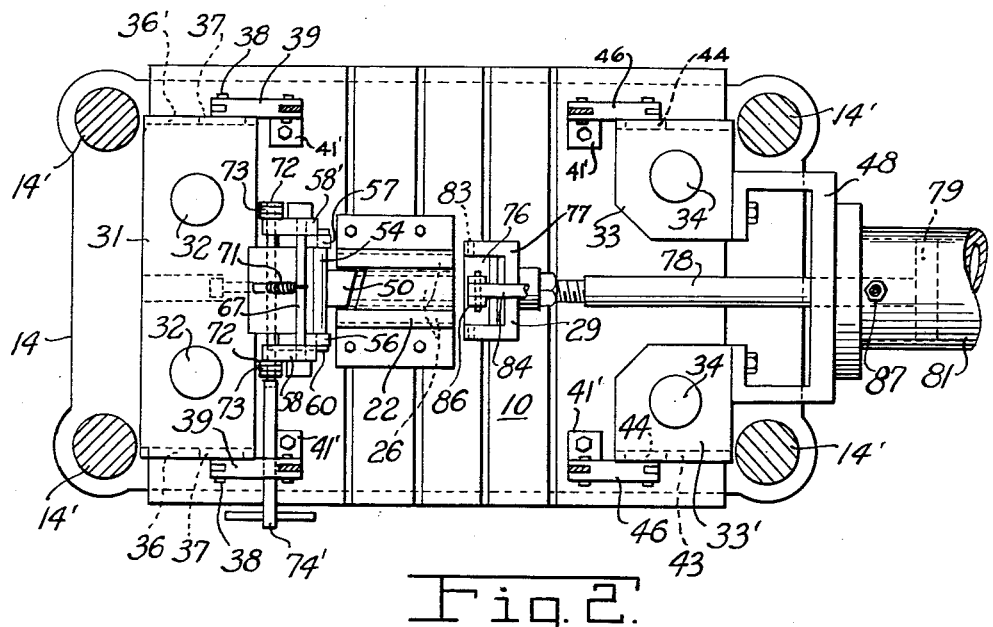
FIG. 2 is a view in section taken on line II—II in FIG. 1, a part of a clamp operating handle being broken away.

The blade is formed in a machine 5 (see FIGS. 1 and 2). The blade is molded from a plurality of elongated resin-impregnated glass fibre rovings 6 (FIG. 1) or the like which are prestressed in tension during molding. The rovings extend along the blade and are divided into two sections 7 and 7' at the root end of the blade. A small bundle of rovings 8 is disposed between the sections 7 and 7'. The rovings of the bundle 8 extend transversely of the elongated rovings and serve to fill the space between the section 7 and 7'.

The elongated fibres extend along the blade portion so that, when the blade is in use in a compressor rotor (not shown), the prestressed fibres can take the centrifugal load caused by rotation of the rotor, and the resin of the blade does not take the load. The resin of the blade is stressed in compression when the blade is at rest.

When formed in the machine 5, the blade may be in the condition shown in FIG. 6. In this condition the root end of the blade includes excess portions 9 and 9' which are trimmed away. In addition, any flash 9" surrounding the blade portion may be trimmed away to form the finished blade of FIG. 7.

The main portion of the blade preferably is molded of rovings. If desired, woven, resin-impregnated glass fibre cloth may be substituted for some or all of the prestressed rovings. In addition, facing sheets of resin-impregnated glass fibre cloth may be disposed on opposite sides of the elongated rovings and the facings may be unstressed during molding to provide facings which are stressed in compression when the blade is at rest but are substantially unstressed when the blade is in use.

As illustrated in FIG. 1, the machine 5 includes a stationary lower backing member or plate 10 and a movable upper backing member or plate 12. The upper member 12 is secured to a movable platen 13, and the lower member 10 is mounted on a stationary platen or base member 14. The movable platen 13 is guided by guide columns 14' and may be raised and lowered by means of toggle links 15, 15' and 16, 16'. The links 16 and 16' are actuated by a piston 17 in a cylinder 18. The links 15 and 15' are actuated by a similar piston (not shown) in a cylinder 19. The upper ends of links 15 and 16 are pivotally connected to a stationary back-up plate 21 so that, when the pistons in cylinders 18 and 19 are driven outwardly, the links are brought toward vertical alignment to drive the movable platen 13 and upper backing member 12 downwardly toward the lower backing member 10.

Molds or die members 22 and 23 are mounted on members 10 and 12, respectively. The molds 22 and 23 are disposed to close upon the prestressed resin-impregnated reinforcing fibres 6 to mold the resin of the fibres to the shape of the mold cavity formed between the mold members 22 and 23 thereby molding said fibres to the blade form indicated in FIGS. 6 and 7. The molds may apertured, as indicated at 26 in FIG. 1 to receive heating elements (not shown).

Before the molds are closed, the reinforcing fibres 6 are anchored at one end in a double-acting root clamp assembly 28 and gripped by a tensioning clamp 29 at the other end.

The root clamp assembly 28 is mounted on a movable block 31, that is guided on guide posts 32. These posts are parallel to the platen guide posts 14' so that the block 31 can move in the same direction in which the movable platen 13 moves. The clamp 29 moves up and down with blocks 33 and 33' as will be explained more fully hereinafter. The blocks 33 and 33' are guided by guide posts 34 which are parallel to posts 32 and 14' so that the movable platen and the clamps reciprocate in parallelism.

The block 31 is provided with horizontal dovetail slots 36 and 36' at opposite ends thereof (see FIGS. 1 and 2). The slots 36 act as rails or guides for sliding pieces 37. The sliding pieces 37 carry pivot pins 38 for adjacent ends of links 39 and 41. The links 39 and 41 support the block 31. The other ends of the links 39 and 41 are pivotally connected to the upper backing member 12 and the lower backing member 10, respectively, through lugs 41' which are attached to the backing members. The links 39 and 41 are of equal length so that the block 31 is held substantially midway between the faces of the backing members 10 and 12 as the die members are closed and opened. Similarly, the blocks 33 and 33' are provided with dovetail slideways 43 in which sliding pieces 44 are mounted. The adjacent ends of the links 46 and 47 are pivotally connected to the sliding pieces 44 while their other ends are pivotally connected to the upper backing member 12 and the lower backing member 10, respectively, through lugs 41' secured to said members. Thus the links 46 and 47 connect the sliding pieces 44 with the upper and lower backing members, respectively, so that the blocks 33 and 33' also are maintained substantially midway between the members 12 and 10 as the movable die member 23 reciprocates toward and away from the stationary die member. The blocks 33 and 33' are connected by a rigid C-shaped bracket 48 which is attached to both of the blocks 33 and 33' so that the blocks 33 and 33' move up and down together.

Details of construction of the clamp assembly 28 are shown most clearly in FIGS. 3 and 4. The clamp assembly 28 includes an intermediate die member 49 which is mounted on the block 31. The die member 49 includes a die portion 50, which projects between the main dies 22 and 23, as shown in FIG. 1. In addition, the die member 49 includes clamping surfaces or faces 52 and 53 between the die portion 50 and the block 31. Clamp rolls 54 and 55 engage and clamp reinforcing fibres 7 and 7' against the clamping surfaces 52 and 53, respectively, as shown in FIG. 4. The clamping rolls 54 and 55 may be provided with knurled or ribbed surfaces, as indicated in FIGS. 3 and 4 to give a good grip.

The clamping rolls are journaled in bearing plates 56 and 57, which are mounted on block 31 on opposite sides of the intermediate die member. The pivots of the clamping rolls are eccentric so that, when the clamping rolls are turned from the FIG. 3 position to the FIG. 4 position the knurled faces of the clamping rolls approach the clamping faces 52 and 53 of the intermediate die member to exert clamping pressure on the reinforcing fibres.

The clamping rolls are actuated by sliding plates 58 and 58'. The sliding plates are provided with dovetail slots 59. The dovetail slots receive dove tails 60 on the bearing plates 56 and 57 which guide the sliding plates for reciprocation in a direction perpendicular to the direction of reciprocation of block 31. Each of the sliding plates includes a pair of upright slots 63 and 64 in which crank pins 66 and 67 are received. The crank pins 66 and 67 are connected to the rolls 55 and 54, respectively, by crank arms 69. Springs 71 urge the crank pins to the clamping position shown in FIG. 4. The clamping rolls may be released by operation of release cranks 72. When the release cranks are swung from the position shown in FIG. 4 to that shown in FIG. 3, rolls 73, mounted on the release cranks engage the sliding plates 58 and 58' to move the sliding plates a sufficient distance to release the clamping rolls. Sockets 74 are provided in the sliding plates 58 and 58' to receive the rolls 73 for holding the release cranks 72 in the FIG. 3 position. The release cranks may be operated by an appropriate removable wrench 74' as indicated in FIG. 2.

The clamp 29, as shown in FIG. 1, includes a pair of clamping rolls 75 and 76 which are mounted in a head 77 at one end of a piston shaft 78. The piston shaft 78 is attached to a piston 79 which reciprocates within a cylinder 81. The cylinder 81, in turn, is supported on the bracket 48 which connects the blocks 33 and 33' so that the piston 79, clamp 29, and blocks 33 and 33' move up and down together as a composite block.

The clamp roll 76 is pivotally mounted on an eccentric pivot 83. A handle 84 is attached to a crank arm 86 for turning the clamping roll 76. When the handle 84 is drawn to the right, to the position shown in FIG. 1, the face of the clamping roll 76 is brought toward the face of the roll 75 so that the rolls 75 and 76 can grip the right hand ends of the reinforcing fibres 6. Then, when fluid under pressure is introduced into the cylinder 81 through port 87, the piston 79 and piston rod 78 are urged to the right to draw the reinforcing fibres taut and prestress the fibres in tension. Then, when the main dies 22 and 23 are brought toward each other and into co-operating relation with the intermediate die 49, the prestressed resin impregnated reinforcing fibres 6 are moved downwardly but at a rate one-half of that at which the upper die member 22 moves downwardly so that the reinforcing fibres and the intermediate die are maintained midway between the main dies as the main dies are brought toward each other to engage and mold the resin of the reinforcing fibres.

The dies 22 and 23 are provided with appropriate heating elements (not shown) received in the interior bores 26, as already pointed out. The dies are heated to sufficient temperature to cause setting of the resin while the piston 79 is urged to the right to prestress the reinforcing fibres in tension. The resin may be a suitable thermosetting resin, such as a phenol formaldehyde resin, and the resin is set to maintain the prestress load on the fibres. The dies mold the reinforcing fibres into blade form, so that, when the main dies are drawn apart, and the blade is removed from the dies, the blade has the rough form illustrated in FIG. 6. As already pointed out, the rough blade is then trimmed to the final shape shown in FIG. 7.

The machine illustrated in the drawings and described above, is subject to structural modification without departing from the spirit and scope of the appended claims.

Having described my invention, what I claim as new and desire to secure by Letters Patent is:

1. A machine for molding a blade which comprises a pair of spaced parallel main plates; means for moving said plates toward each other; a pair of spaced clamp blocks; means for guiding said clamp blocks for reciprocation parallel to the direction of movement of the plates, each of said clamp blocks having a track extending perpendicularly to said direction; a sliding piece mounted on the track of each block; a pair of links connecting the plates to each sliding piece, the links being of equal length, whereby the blocks are maintained substantially equi-distant between the plates; a die mounted on each plate and movable therewith; clamps means on the clamp blocks for engaging the ends of a plurality of resin-impregnated laminations for supporting said laminations between said dies, said dies being movable toward each other with their respective plates to a position in which said dies define a die cavity therebetween and in which said dies engage and mold said laminations to the shape of said cavity.

2. A machine in accordance with claim 1 characterized by the fact that an intermediate die is mounted on one of said clamp blocks, said intermediate die having a portion projecting between the first mentioned dies, that the clamping means of said one of the clamp blocks clamps a section of the laminations on each side of the intermediate die, and that the first mentioned dies are maintained equi-distant from the faces of the intermediate die as the first mentioned dies are advanced toward each other.

3. A machine in accordance with claim 1 characterized by the fact that the clamping means of one of the clamp blocks includes a cylinder mounted thereon for movement therewith; a piston in said cylinder; a piston rod attached to said piston; a clamp carried by said piston rod for clamping the laminations; and means for injecting fluid under pressure into said cylinder to urge the piston in a direction to prestress the laminations in tension as the dies are brought together whereby the laminations are prestressed in tension when the laminations are molded by the dies.

4. A machine for molding a prestressed blade from a plurality of plastic impregnated fibres; said machine comprising a pair of spaced parallel main plates; means for relatively moving said main plates toward each other; a pair of spaced clamp blocks for engaging opposite ends of said fibres; means for guiding said clamp blocks for movement parallel to the direction of relative movement of the plates, each of said clamp blocks having a track extending perpendicularly to said direction; a piece mounted on the track of each block for sliding motion therealong; a pair of links connecting the plates to each slidable piece, the links being of equal length, whereby the blocks are maintained substantially equi-distant between the plates; a main die mounted on each plate said dies being movable toward each other with their respective plates to a position in which they define a die cavity therebetween; an intermediate die mounted on one of the clamp blocks, said intermediate die having a portion projecting between the main dies; means on said one of the clamping blocks for engaging a section of one end of said fibres on each side of the intermediate die; a clamp mounted on the other clamp block for engaging the other end of said fibres for supporting said fibres between said main dies, said last mentioned clamp being movable with the clamp block on which it is mounted and being mounted thereon for reciprocation relative to said clamp block parallel to the tracks of said clamp block; and means for urging the reciprocatable clamp in a direction to prestress said fibres in tension, the clamp blocks holding the laminations midway between the dies as the main dies are brought toward each other to mold said fibres to the shape of said cavity.

5. A machine for fabricating an article from a plurality of plastic impregnated fibres; said machine comprising a mold structure having a plurality of mold parts movable toward and away from each other, said mold parts being movable toward each other to a closed position in which said mold parts define a mold cavity therebetween; a pair of clamps for gripping the opposite ends of said fibres for supporting the fibres between said mold parts with said fibres being spaced from said mold parts when said mold parts are moved away from each other; means for moving one of said clamps in a direction for stressing said fibres in tension; means for relatively moving said mold parts toward each other to close the mold on said stressed fibres so as to mold said fibres to the shape of said cavity; and means connecting said clamps to said mold parts for moving said clamps in unison with the closing of said mold parts to maintain the same relative position of the stressed fibres between the mold parts while the mold parts are moving toward their closed position as when the mold is closed.

6. A machine as recited in claim 5 in which the means for moving the clamps with the mold parts comprises links pivotally connecting each clamp to said mold parts.

7. A machine as recited in claim 5 in which the means for moving the clamps with the mold parts comprises a pair of blocks with each of said blocks supporting one of the clamps of said pair of clamps, each block having means slidable in a guideway on said block and having links pivotally connecting said slide means to said mold parts; and the means for moving one of said clamps to stress the fibres comprises a power unit supported on the block for said clamp and connected to said clamp for moving said clamp in a direction to stress said fibres.

8. A machine for fabricating an article from a plurality of plastic impregnated elongated fibres; said machine comprising a pair of molds having operative means connected thereto for movement of said molds into a position in which a mold cavity is defined therebetween, a pair of clamps disposed in a plane of reference between said molds and including means receiving and supporting moldable fibres extended in spaced relation between said molds, and means operatively connected to said clamps and said mold operative means for coordinated movement of said clamps in the course of relative mold movement retaining said fibres at all times disposed relatively equi-distant between said molds through the molding of said fibres to the shape of said mold cavity.

9. A machine substantially as defined as by claim 8 wherein one of said clamps includes means independently operable for prestressing said fibres in tension prior to molding thereof.

References Cited in the file of this patent
UNITED STATES PATENTS

| | | |
|---|---|---|
| 1,222,602 | Chamberlin | Apr. 17, 1917 |
| 1,622,590 | Jolstad | Mar. 29, 1927 |
| 1,748,603 | Heacock et al. | Feb. 25, 1930 |
| 2,103,339 | Salfisberg | Dec. 28, 1937 |
| 2,131,300 | Reiser | Sept. 27, 1938 |
| 2,378,642 | Kopplin | June 19, 1945 |
| 2,482,981 | Kamrass | Sept. 27, 1949 |
| 2,621,140 | Bitterli et al. | Dec. 9, 1952 |
| 2,630,868 | Ellenberger | Mar. 10, 1953 |
| 2,712,744 | Miller et al. | July 12, 1955 |
| 2,759,217 | Peterson | Aug. 21, 1956 |